United States Patent [19]

Schatteman

[11] 4,361,859

[45] Nov. 30, 1982

[54] LOADING SYSTEM FOR VIDEO CASSETTES

[75] Inventor: Etienne A. M. Schatteman, Brussels, Belgium

[73] Assignee: Staar S.A., Brussels, Belgium

[21] Appl. No.: 138,089

[22] Filed: Apr. 7, 1980

[30] Foreign Application Priority Data

Apr. 13, 1979 [FR] France ................................ 79 10275

[51] Int. Cl.³ ...................... G11B 23/04; G11B 19/18
[52] U.S. Cl. .................................... 360/96.5; 360/93; 360/105
[58] Field of Search ............ 360/96.5, 96.6, 96.1–96.4, 360/92, 93, 105, 137; 242/197–199

[56] References Cited

U.S. PATENT DOCUMENTS 4,004,752  1/1977  Kamaya ......................... 360/96.6 X
4,087,844  5/1978  Takahashi et al. ................... 360/105
4,159,495  6/1979  Tsutsumi ........................ 360/96.5 X Primary Examiner—John H. Wolff
Attorney, Agent, or Firm—Leydig, Voit, Osann, Mayer and Holt

[57] ABSTRACT

Cassette loading apparatus for video machines, the apparatus having a movable housing which carries the cassette into engagement with the tape driving, play back and recording components of the video machine, and a cassette transport mechanism which transports the cassette from its insertion or rest position into the housing, the cassette transport mechanism being self-powered by a drive motor which moves the transport mechanism and thereby the cassette inward from its insertion position to an intermediate position within the housing. The housing is then moved as a unit to carry the cassette into its operative position. A protective door provided on the front edge of the cassette to protect the tape is displaced from the cassette automatically as an incident to movement of the housing to carry the cassette into its operative position, and is returned to the protecting position when the housing returns the cassette from the operative position.

15 Claims, 12 Drawing Figures

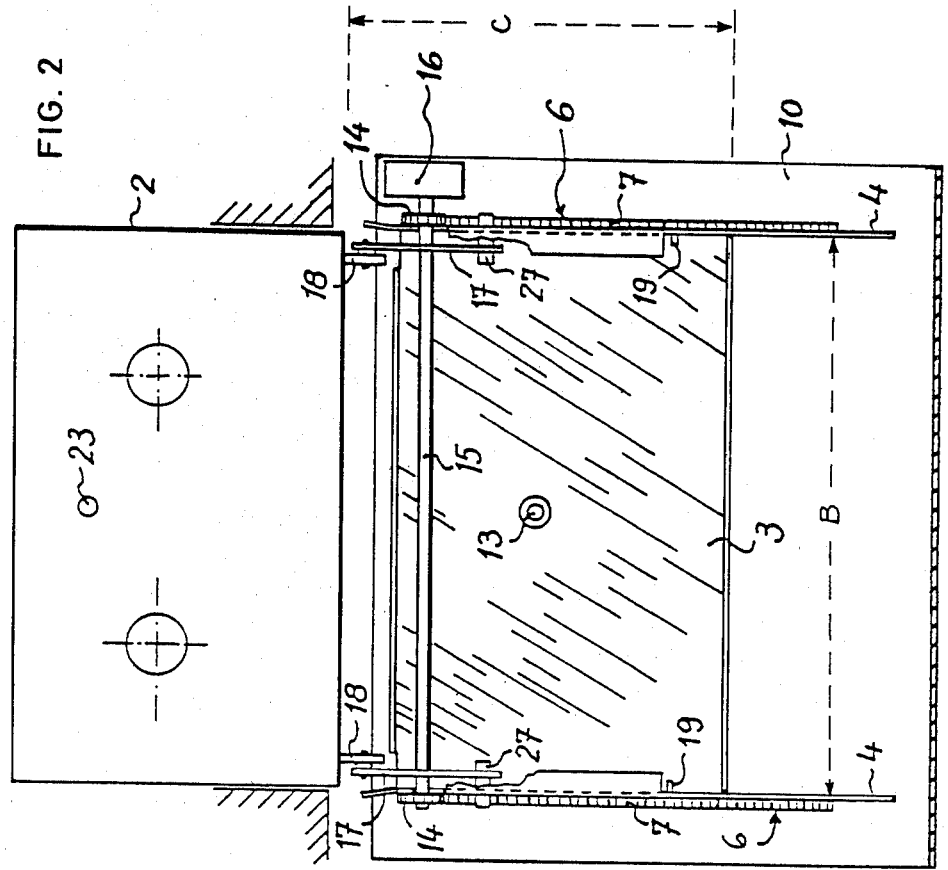
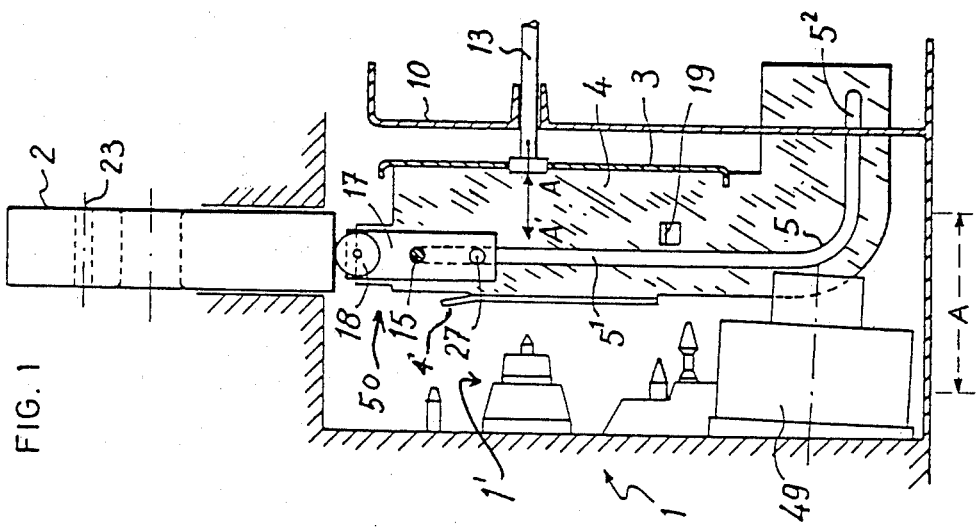

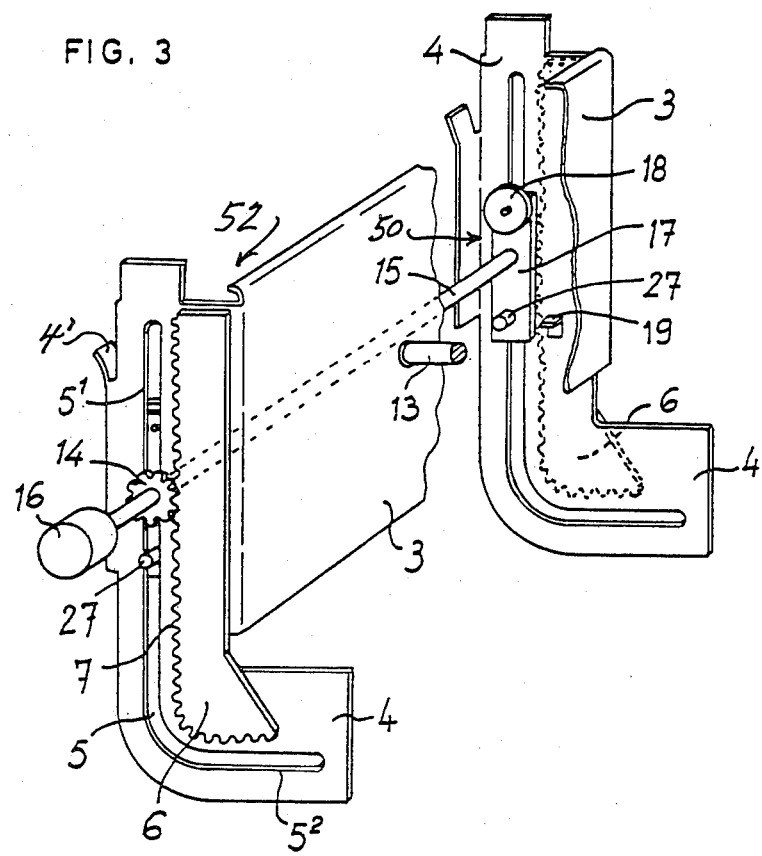
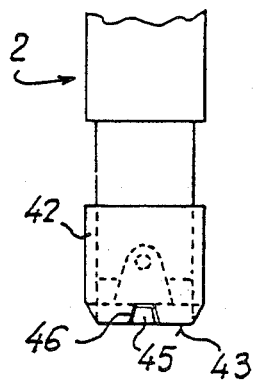
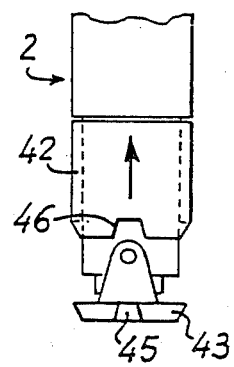
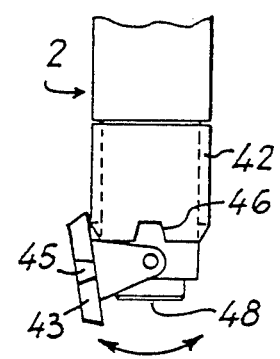

LOADING SYSTEM FOR VIDEO CASSETTES

The present invention relates to a cassette loading apparatus for machines which record and play back information on magnetic tape contained in a cassette and, more particularly, a cassette loading apparatus for video machines.

Numerous cassette loading machines have been provided to automatically insure the placing of cassettes in their operative position in a tape deck, and to eject the cassettes, but their complexity involving numerous levers, gears, springs, etc. and their size has made them complicated to manufacture and unreliable in operation.

Since reliability in a video machine is an important factor, the principal aim of the present invention is to provide an automatic device for loadng cassettes in the operative position within the video machine, and for ejecting cassettes, which is extremely reliable in operation.

Moreover, the current tendency being to develop compact machines, another object of the invention is to provide a relatively compact cassette loading apparatus, intended to operate and move the cassette within a cubic volume having corresponding dimensions not more than a third greater than the length and width of the cassette nor having a depth greater than about twice the thickness of the cassette.

In carrying out the invention, the cassette loading apparatus of this invention is characterized by a movable housing which carries the cassette into engagement with the tape driving means, play back and recording components of the video machine, and a cassette transport mechanism which transports the cassette from its insertion or rest position into the housing, the cassette transport mechanism being self-powered by means of a drive motor which moves the transport mechanism and thereby the cassette inward from its insertion position to an intermediate position within the housing. The housing is then moved as a unit to carry the cassette into its operative position. An important feature of the invention is the ability to release a protective door provided on the front edge of the cassette to protect the tape, so that the tape is accessible to the tape recording and play-back components of the video machine, and to cause both the cassette to move to its operative position and the protecting door to be displaced free and clear of the cassette automatically as an incident to the housing carrying the cassette into its operative position.

Further objects and advantages of the invention will become apparent from the following description taken in connection with the accompanying drawings, in which:

FIG. 1 is a cross-sectional view of the cassette loading apparatus taken substantially in the planes of lines 1—1 of FIG. 2;

FIG. 2 is a vertical elevation view of the cassette loading apparatus;

FIG. 3 is a perspective view of the housing which receives the cassette and of the cassette transport mechanism effecting the inward movement of the cassette and the ejection of the cassette;

FIGS. 5, 5A and 5B are detailed views illustrating a cassette having a door for protecting the magnetic tape;

Figure 4:
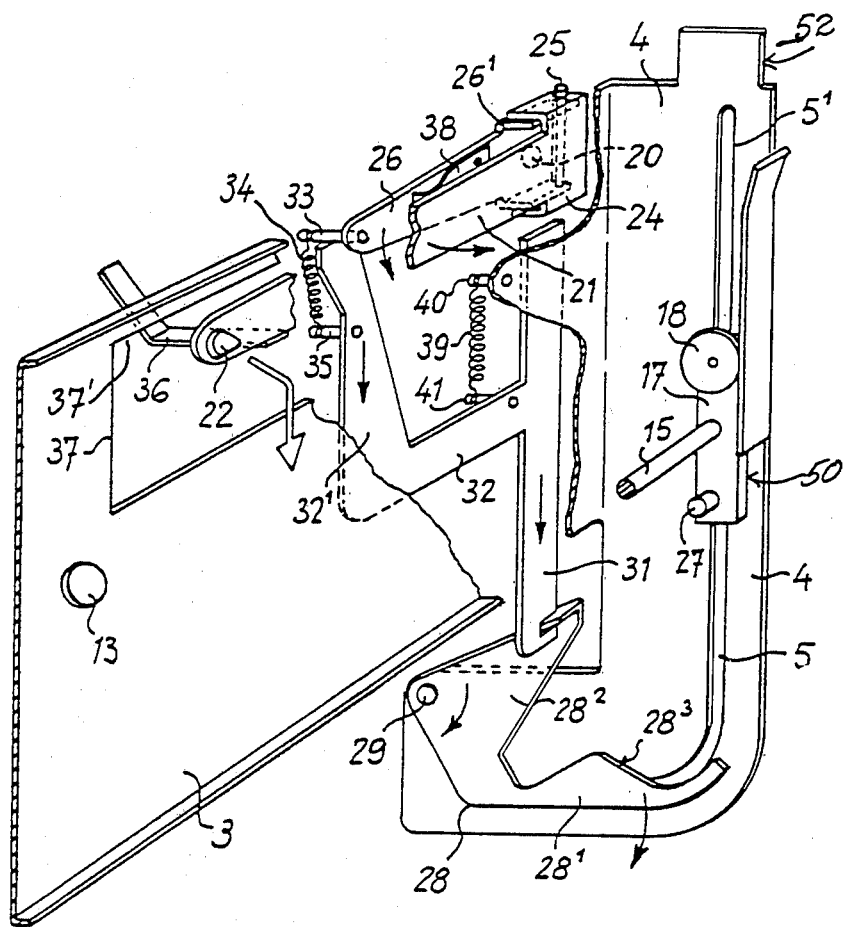
FIG. 4 is a perspective view with parts broken away of the mechanism for latching the cassette in position in the housing and for locking and unlocking the door over the front edge of the cassette.

In FIG. 1 of the accompanying drawings, there is illustrated a plate 1 fixed to the chassis of the video machine and having means 1' for driving the tape and components for recording and for playing back recordings on magnetic tape contained within a video cassette 2, the tape driving means 1' and other components being schematically illustrated in the drawings.

Figure 6:
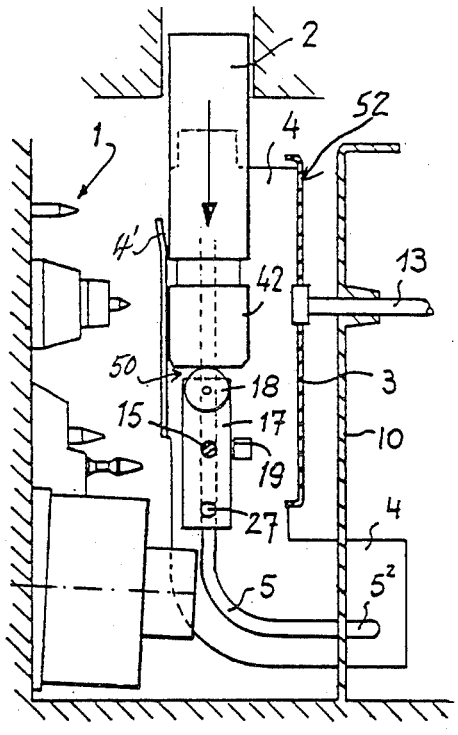
FIGS. 6, 6A and 6B are vertical sectional views with parts shown in elevation illustrating in stop-motion fashion the movement of the cassette by the loading apparatus from the insertion position through the intermediate position shown in FIG. 6A to the operative position shown in FIG. 6B.
Figure 6A:
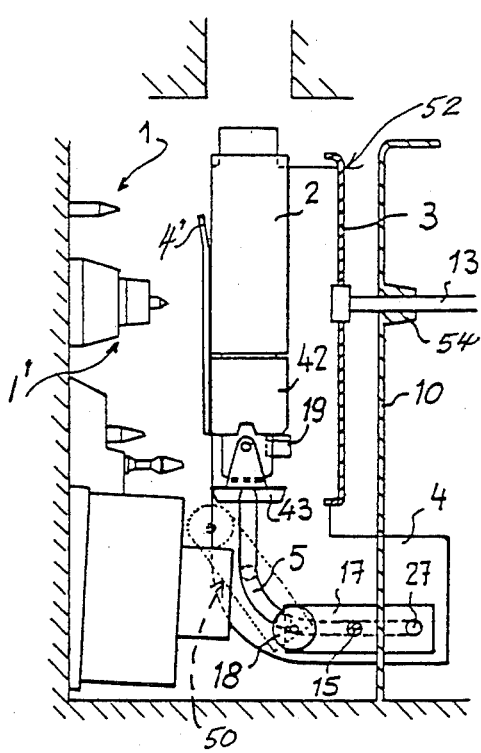
Figure 6B:
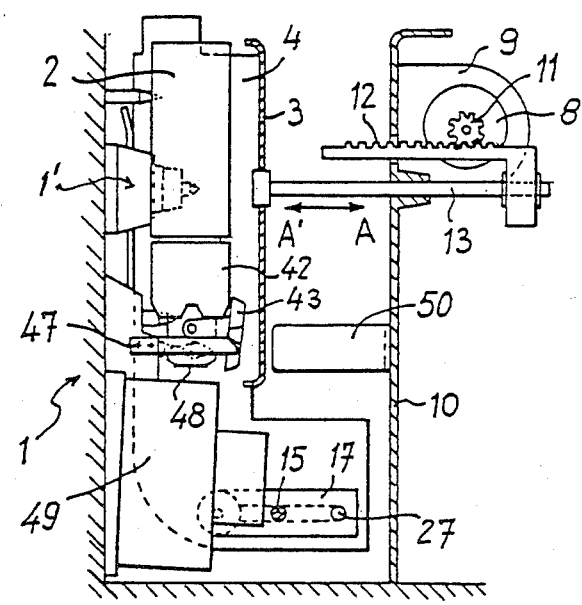

In accordance with the invention, an apparatus is provided within the video machine for loading a video cassette from the rest or insertion position shown in FIGS. 1 and 2 and in which the cassette has been placed manually, and mechanically placing it in the operative position shown in FIG. 6B where the driving means, play-back and recording components 1' are fully engaged with the tape within the cassette, and for ejecting the cassette to the rest position of FIGS. 1 and 2. The cassette 2 is transported by a transport mechanism 50 front edge first inward in its own plane as shown in FIG. 6 from the insertion position of FIGS. 1 and 2, to an intermediate position shown in FIG. 6A where it is located within a housing 52 of the loading apparatus. By movement in its own plane is meant movement edge first in substantially a single plane. Means including the guide strips 4' projecting inward from the sidewalls 4 of the housing constrain the movement of the cassette inward and outward in its own plane.

In order to move the cassette transversely (face forward) from the intermediate position (FIG. 6A) toward the plate 1 and bring into operative engagement with the tape and reel elements of the cassette (as shown in FIG. 6B) the driving, play-back and/or recording components 1' of the video machine, or to release the cassette from the components 1' and free it for return to the insertion position, the housing 52 is supported for movement transversely to the plane of movement of the cassette by means including the shaft 13, which is slidably supported in an elongated bearing 54 mounted in a vertical wall 10 of the video chassis. The housing 52 includes a plate 3 which is located parallel to the plane of the cassette and is bent at its lateral sides to form the sidewalls 4 for the housing, the end of the shaft 13 being supported in an end bearing 56 so that the shaft 13 is free to turn.

In keeping with the invention the transport mechanism 50 for the video cassette 2, is carried by the housing 52, being guided throughout the path of its movement by means including L-shaped grooves 5 in the walls 4 for the housing, the grooves having a main portion 5' and a bottom portion $5^2$. When the loading apparatus is mounted with a vertical orientation as shown in FIGS. 1 and 2, the lateral walls 4 of the housing 52 are mounted vertically and the groove 5 has a main vertical portion 5' and a horizontal portion $5^2$. Adjacent the groove $5^2$ is mounted a toothed rack 7 on each side wall of the housing, with the teeth arranged adjacent both portions $5^1$ and $5^2$ of the groove 5 so that they follow a similar path.

The transport mechanism includes pinions 14 at opposite ends of a shaft 15, which pinions 18 are in engagement with the racks 7 on both sidewalls 4 of the housing 52. The shaft 15 also carries a motor 16 which drives the shaft 15 to move the transport mechanism along the rack 7 in both lowering and raising directions.

On each end of the shaft 15 and in proximity to the inside faces of the lateral walls 4 there are rectangular plates 17 each carrying a roller 18 which supports the video cassette 2 on its front edge, as shown in FIGS. 1 and 2. The plates 17 also carry guide pins 27 which enter the grooves 5 in the lateral walls of the housing.

The transverse movement of the housing 52 towards and away from the plate 1 is effected by means of an electric motor 8 (FIG. 6B) mounted on a plate 9 affixed to a metal sheet forming a wall 10 of the chassis. The output shaft of the motor 8 carries a pinion 11 in mesh with a rack 12 which passes through the chassis wall 10 and extends parallel to the shaft 13 to which it is rigidly fastened. It will be seen that by rotation by means of the motor 8 of the pinion 11 in one direction or the other, the housing 52 will be moved horizontally (when the loading apparatus is mounted in the orientation shown in FIGS. 1–6) toward and away from the chassis wall 1 to carry a cassette and into and out of operative engagement with the driving, play-back and recording components of the video machine.

In order to transport the cassette 2 to the operative position (FIG. 6B) from the insertion or rest position (FIG. 1), by control means (not shown) the motor 16 of the transport mechanism 50 is started and the cooperation of the pinions 14 driven by the motor 16 with the racks 7 on the housing 52 moves the transport mechanism including the drive motor 16 inward parallel to the plane of the cassette and into the housing, the grooves 5 serving for guiding the transport mechanism and the cassette which rests on the rollers 18 as it is lowered into the machine. As it descends, a ring 42 on the cassette 2 comes to rest upon two stops 19, one of which can be seen below the front edge of the cassette 2 in FIG. 6 and which are provided on the lateral walls 4 of the housing 52, before the cassette reaches its intermediate position and in the course of the final portion of movement of the cassette 2 to the intermediate position, the ring 42 is moved axially relative to the cassette 2 as indicated by the arrow in FIG. 5A in order to release a door 43 on the front edge of the cassette 2 provided to protect the magnetic tape. With the cassette resting on the stopping means 19, the drive motor 16 continues to operate to move the transport mechanism 50 and separate the latter from the cassette 2. Thus, the transport mechanism 50 including pinions 14, shaft 15 and plates 17, which are associated with the motor 16 continue their movement through the curved portion of the lower end of the vertical groove 5' and into the horizontal section $5^2$ of the groove. Movement along the horizontal section $5^2$ of the groove results in horizontal movement of the transport mechanism 50, which is provided in order to displace the transport mechanism free and clear of the plate 1 and the components carried thereon, to enable the cassette to be moved transversely toward the plate 1 without any mechanical interference occurring, particularly with the video head 49.

Certain types of cassettes are provided with elements adjacent the front edge of the cassette to protect the magnetic tape when the cassette is in the inoperative position. As shown in FIGS. 5, 5A and 5B, one form of such device is a door 43 adjacent the front edge of the cassette 2 which is maintained in closed position by the ring 43 under the action of a spring not shown. The ring 43 serves to lock the door in closed position by cooperation of notches 46 located in the lateral sidewalls of the ring 42 which receive abutments 45 on the lateral side edges of the door 43. When the ring 42 is forced upwards from the position of FIG. 5 counter to the spring, the notches 46 release the abutments 45 of the door (FIG. 5A) and the door is unlocked and free to rock forwards or backwards and thus to permit access to the magnetic tape.

Figures 4A, 4B:
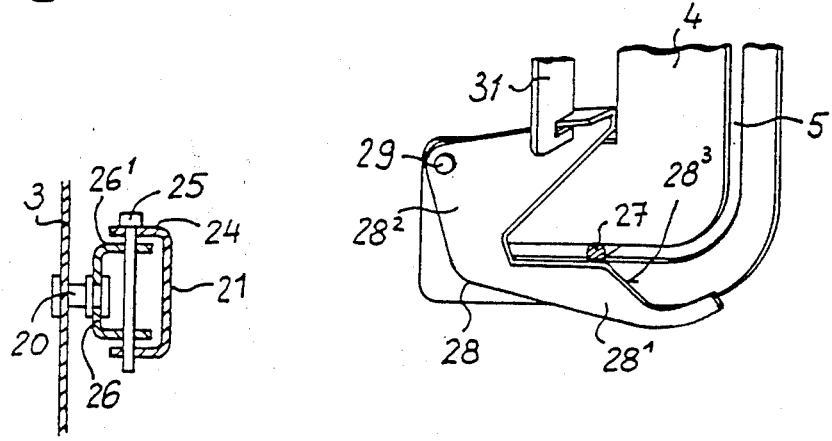
FIGS. 4A and 4B are detailed views of portions of the mechanism shown in FIG. 4.

In carrying out the invention, means are provided supported by the transport mechanism housing 52 to latch the cassette 2 against movement in the housing as the cassette moves to the intermediate end operative positions, and to automatically release the door 43 by movement of the locking ring 42 on the cassette and permit access of the recording and play-back heads to the magnetic tape and allow the video machine to perform its function. To this end, there is provided on the plate 3 of the housing in proximity with its top edge a pair of levers 21, 26 which are supported by an articulated joint carried on an axle 20 (FIGS. 4 and 4A). Lever 21 is thus supported for pivotal movement in both the vertical direction about the axle 20 and the horizontal direction about the axle 25, and carries at its remote end a pin 22, the function of which is to penetrate into the cassette through an aperture 23 (FIGS. 1, 2) upon movement of the lever 21 horizontally and to move the cassette inward in the housing upon movement of the lever 21 vertically. Vertical movement of the lever 21 causing inward movement of the cassette 2 effects the unlocking of the door 43 of the cassette protecting the magnetic tape.

Turning again to FIGS. 3 and 3A, in order for the joint illustrated in these figures to provide for both horizontal and vertical pivotal movement of the two levers 21, 26, it comprises a fork 24 forming part of the lever 21, the arms of which are crossed by an axle 25 which allows the horizontal movement of the lever 21. The joint also includes a fork 26' adapted to pivot about the axle 20 allowing vertical movement of both levers 21 and 26 and forming part of the lever 26 which extends substantially parallel to the lever 21. A leaf spring 38 is interposed between the two lever arms to maintain them apart.

The loading apparatus also includes as part of the means for moving the cassette 2 relative to the stopping means 19 to unlock the cassette door 43, a lever 28 mounted at the lower part of the housing 52 (FIGS. 4 and 4A) which lever 28 is adapted to be pivoted about an axle 29 responsive to the movement of the transport mechanism 50 transverse to the plane of vertical movement of the cassette as it is guided in the final part of its stroke by the bottom of the guide groove $5^2$. As indicated in FIG. 4B, the arm 28 is located adjacent the bottom portion $5^2$ of the groove 5 and is engaged by a pin 27 on the plate 17 of the transport mechanism as the pin moves along the bottom portion of the groove. The top edge $28^3$ of the arm 28' has a profile intended to cam the lever 28 clockwise about its axle 29 as the pin 27 engages the inclined cam edge $28^3$ of the lever 28, and to maintain the lever 28 in its cocked counter-clockwise position as the pin 27 moves along the flat portion $28^4$ of the lever.

To transmit the pivotal motion of the lever 28 to the lever assembly 21, 26, there is attached to the lever 28 a flat member 31 arranged vertically and having an elbowed arm 32 formed integral therewith. The upward extending portion 32' of the arm 32 contacts the underside of a pin 33 carried by the lever 26 of the lever assembly. By means of a spring 34 and a pin 35, the elbowed arm 32 is connected to the lever 26. Pivotal clockwise movement of the lever 28, therefore, pulls the lever assembly 21, 26 vertically downward counter-clockwise about its supporting axle 20 via the spring 34. Downward movement of the arm 32 is also resisted by the return spring 39 which is connected between two pins 40, 41 affixed respectively to the plate 3 and the elbowed arm 32. Such downward movement of the arm 32 in addition to pivoting the lever assembly 21, 26 counter-clockwise, also allows horizontal movement of the lever 21 inwardly of the housing under the urging of the spring 38 and thus causes the pin 22 on the remote end of the lever 21 to enter the opening 23 in the cassette 2. This inward motion of the lever 21 is controlled by the upwardly angled portion of the arm 36 carried by the lever 21 which engages the lower edge 37' of an opening 37 in the plate 3 of the housing 52. After the pin 22 penetrates the aperture 23 in the cassette 2, further downward movement of the arm 32 causes the cassette 2 to be moved downward in the housing 52, to complete its movement to the intermediate position shown in FIG. 6A. Thus it will be seen that the movement of the transport mechanism along the bottom portion 5' of the slot 5 causes the lever arm 28 to pivot clockwise and the cassette to be engaged and moved to its intermediate position by the entry of the pointed element 22 into the opening 23 in the cassette.

How the door 43 is unlocked and moved away from the front edge of the cassette while the cassette is moved to its intermediate and operative positions will now be reviewed.

During the descent of the cassette 2, as above noted, it comes to rest on the stops 19 carried on the lateral walls 4 of the housing 52. The transport mechanism 50 continues to travel downward leaving the cassette resting on the stops 19. After the transport mechanism enters the horizontal portion $5^2$ of the groove 5, the cassette is engaged, by the action of the lever assembly 21, 26, by the pin 22 entering the cassette aperture 23 and the cassette is forced downwardly as the lever 21 pivots inwardly and downwardly (as shown by the arrow in FIG. 4) controlled by the interaction of the inclined bent portion of the tab 36 against the lower edge of the opening 37 in the housing plate 3. This short final downward stroke of the cassette 2 causes the movement of the body of the cassette relative to the ring 42 which is relatively lifted clear of the door 43. The door is left completely free to rock and to permit access to the magnetic tape 48.

When the transport mechanism 50 has reached the end of its stroke in the bottom portion $5^2$ of the grooves 5, the housing 52 is moved transversely by means of the motor 8 being started (by control means not shown) so as to shift the housing 52 and the cassette supported therein transversely into the operative position (FIG. 6B). As the cassette approaches the operative position adjacent the plate 1, a lever 47 fixed on the plate 1 engages and pivots the door 43 of the cassette 2 away from the front edge of the cassette thus providing access to the tape. As shown by the drawings, the transport mechanism operates to move a cassette within a cubic volume having corresponding dimensions not more than a third greater than the length and width of the cassette nor having a depth greater than about twice the thickness of the cassette, as indicated by the dimensions A, B and C in FIGS. 1 and 2.

The ejection of the cassette from the operative to the insertion position is caused by first operating the motor 8 to move the housing 52 in the direction A (FIG. 6B) so as to separate the cassette 2 from operative engagement with the components 1' on the plate 1 of the video chassis. During this movement A, a lever 51 (FIG. 6B) engages and closes the door 43 against the front edge of the cassette 2. The motor 16 is then caused to rotate and travel as part of the transport mechanism 50 along the rack 7 so as to move along the horizontal portion 5' of the groove 5 in the sidewalls 4 of the housing 52 and then enter and rise upwardly along the vertical portion $5^1$ of the groove 5. As the pin 27 travels along the horizontal section $5^2$ of the groove 5, the lever 28 is released and allowed to pivot counter-clockwise to the position of FIG. 4, under the action of the return spring 39. As a result of the lever 31-32 rising with the lever 28, the lever assembly 21, 26 rocks so that the pin 22 executes a short upward stroke and then withdraws backwards, unlatching the cassette. The door 43 of the cassette 2 is returned to the positions of FIGS. 5A and 5, the abutments 45 once more being returned into the notches 46 in the ring 42 being once more returned on the abutments 45 to lock the door in its position adjacent the front edges of the cassette.

When the cassette 2 has reached the rest or insertion position (FIGS. 1, 2) it may then be removed by the user.

I claim:

1. In a machine for recording and playing back information on magnetic tape contained in a cassette, a cassette loading apparatus for automatically placing a cassette in operative position with means for driving the tape and components for recording and for playing back recordings on the tape, and for ejecting the cassette, said apparatus comprising:

a housing including means for guiding a cassette upon its inward movement edge forward in substantially a single plane from an insertion position to an intermediate position in said housing or its outward movement to said insertion position;

means on said machine supporting said housing for movement of a cassette transversely to said plane between its intermediate position and its operative position; and cassette transport mechanism movably mounted on said housing, including a drive unit and means operated by said drive unit and cooperating with means on said housing for moving said transport mechanism including said drive unit, to transport a cassette inward to its intermediate position or to transport the cassette outward to its insertion position.

2. In a machine, cassette loading apparatus according to claim 1 further including means on said machine supporting said housing for movement transversely to said plane of movement of a cassette.

3. In a machine, cassette loading apparatus according to claims 1 or 2, further including means on said housing engaged by a cassette during inward transport by said transport mechanism for stopping the cassette in its intermediate position, and means operated by said drive unit and cooperating with means on said housing for continuing to move said transport mechanism and separate the latter from the cassette and from mechanical interference with said driving means for the tape or other components of the machine upon transverse movement of said cassette from its intermediate to its operative position.

4. In a machine, cassette loading apparatus according to claims 1 or 2, wherein said housing includes sidewalls extending transversely to said plane of movement of a cassette which have means for guiding said cassette transport mechanism throughout the path of its movement.

5. In a machine, cassette loading apparatus according to claim 1 or 2, wherein said drive unit includes a drive motor and said means operated by said drive unit and cooperating with means on said housing includes a pinion and cooperating rack for moving said transport mechanism under the power of said drive motor.

6. In a machine, cassette loading apparatus according to claim 4, wherein said guide means for said cassette transport mechanism includes a groove in said side walls of said housing, and said rack is located adjacent and follows a similar path as said groove.

7. In a machine, cassette loading apparatus according to claim 6 wherein said path of said groove and said rack is L-shaped.

8. In a machine, cassette loading apparatus according to claim 4 wherein said guide means supports said cassette transport mechanism for movement along an L-shaped path.

9. In a machine, cassette loading apparatus according to claim 8, wherein said guide means includes grooves in said sidewalls of said housing, and said cassette transport mechanism includes a shaft guided by said grooves and operated by said drive motor.

10. In a machine, cassette loading mechanism according to claim 9 wherein said cassette transport mechanism includes members guided in said grooves carrying rollers which are engaged by the front edge of the cassette, in carrying the cassette during its inward and outward movement in said plane, when the cassette loading apparatus is oriented such that said plane is vertical.

11. In a machine, cassette loading apparatus according to claim 3, further including means for engaging the cassette and moving said cassette relative to said stopping means and cooperating with means on said machine to unlock a door in the front edge of the cassette protecting the magnetic tape.

12. In a machine, cassette loading apparatus according to claim 11, wherein said means for engaging and moving said cassette includes a lever mounted for pivotal movement in two directions and having a pin adapted to penetrate into the cassette upon lever movement in one of said directions and to move said cassette upon lever movement in the second direction.

13. In a machine, cassette loading apparatus according to claim 11, including means for pivoting said lever in said two directions responsive to the movement of said transport mechanism transverse to said plane of movement of the cassette.

14. In a machine, cassette loading apparatus according to claim 11, wherein said means for engaging and moving said cassette is operable before said cassette reaches the intermediate position.

15. In a machine, cassette loading apparatus according to claim 1, moving the cassette within a cubic volume having corresponding dimensions not more than a third greater than the length and width of the cassette nor having a depth greater than about twice the thickness of the cassette.

* * * * *